United States Patent
Krueger et al.

(10) Patent No.: US 8,766,473 B2
(45) Date of Patent: Jul. 1, 2014

(54) DRIVE AUTHORIZATION SYSTEM FOR AN ELECTRIC DRIVE

(75) Inventors: Andreas Krueger, Aidlingen (DE); Sylvain Subileau, Eningen (DE); Hermann Von Hasseln, Filderstadt (DE)

(73) Assignee: Daimler AG, Stuttgart (DE)

( * ) Notice: Subject to any disclaimer, the term of this patent is extended or adjusted under 35 U.S.C. 154(b) by 470 days.

(21) Appl. No.: 13/255,203

(22) PCT Filed: Feb. 26, 2010

(86) PCT No.: PCT/EP2010/001189
§ 371 (c)(1),
(2), (4) Date: Oct. 17, 2011

(87) PCT Pub. No.: WO2010/102728
PCT Pub. Date: Sep. 16, 2010

(65) Prior Publication Data
US 2012/0038211 A1    Feb. 16, 2012

(30) Foreign Application Priority Data
Mar. 7, 2009    (DE) .................. 10 2009 012 221

(51) Int. Cl.
*B60L 1/00*    (2006.01)

(52) U.S. Cl.
USPC .......................................................... 307/9.1

(58) Field of Classification Search
USPC .......................................................... 307/9.1
See application file for complete search history.

(56) References Cited

U.S. PATENT DOCUMENTS

| 6,752,009 B2 | 6/2004 | Minich et al. |
| 7,581,521 B2 | 9/2009 | Gietzen et al. |

FOREIGN PATENT DOCUMENTS

| DE | 43 36 212 C2 | 4/1995 |
| DE | 102 35 203 A1 | 2/2003 |
| DE | 101 57 680 A1 | 6/2003 |
| DE | 10 2005 039 585 A1 | 2/2007 |
| JP | 2008-149744 A | 7/2008 |
| JP | 2010-120421 A | 6/2010 |

OTHER PUBLICATIONS

Japanese-language Office Action dated Apr. 24, 2013 (Three (3) pages).
Corresponding International Search Report with English Translation dated Apr. 29, 2010 (four (4) pages).
Form PCT/ISA/237 ( six (6) pages).

*Primary Examiner* — Robert L. Deberadinis
(74) *Attorney, Agent, or Firm* — Crowell & Moring LLP

(57) ABSTRACT

A drive authorization system for an electric drive includes a predefined number of field coils and a rotationally movable element. An evaluation and control unit for operation of the electric drive determines the current position of the movable element from several items of positional information, which can be made available by a predefined number of angle of rotation sensors. To implement an electronic immobilization function, positions, the number of the active rotation angle sensors, or both those positions and that number are made encodable. The evaluation and control unit decodes the encoded positional information of the active rotation angle sensors in order to determine the current position of the movable element. Operation of the electric drive is possible only after successful decoding of the positional information.

18 Claims, 1 Drawing Sheet

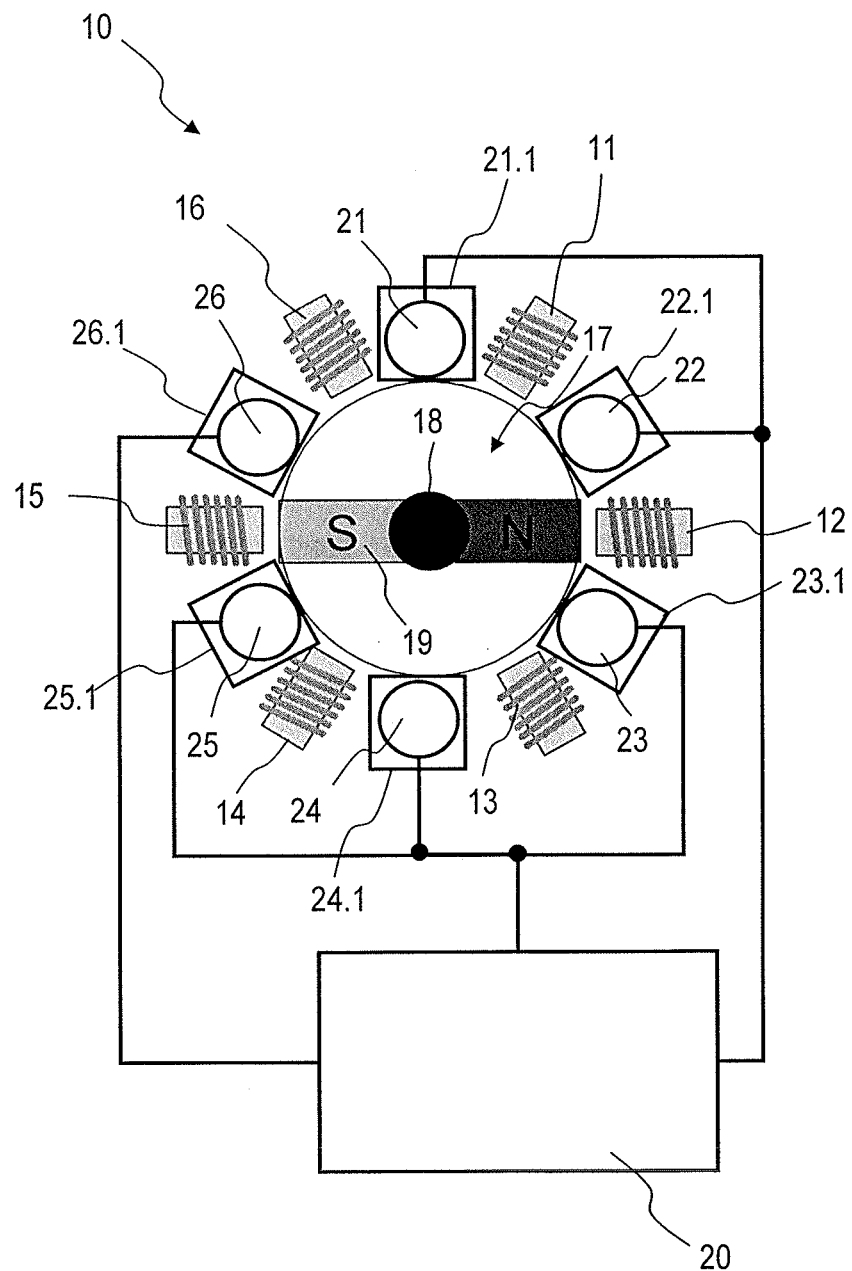

DRIVE AUTHORIZATION SYSTEM FOR AN ELECTRIC DRIVE

BACKGROUND AND SUMMARY OF THE INVENTION

This invention relates to a drive authorization system for an electric drive.

With conventional drive authorization systems, it is possible to circumvent an electronic immobilization function by exchanging components, e.g. control units, which are involved in the drive authorization system. For this reason, in order to increase security, an electronic immobilization function can be coupled mechatronically to a sensor system or actuator system which is difficult to access on the internal combustion engine.

German Patent specification DE 43 36 212 C2 describes a sensor arrangement for detecting cylinders in an internal combustion engine. The sensor arrangement described comprises an encoder disc for detecting a defined position of a crankshaft of an internal combustion engine, a reference mark arranged on the encoder disc, a detector associated with the encoder disc, and a control means which evaluates the signal of the detector. The reference mark marks a predefined position of the crankshaft which is assigned to the reference mark. In order to code the internal combustion engine, the reference mark is assigned to a position of the crankshaft which is specific to the internal combustion engine.

German Publication DE 10 2005 039 585 A1 describes a drive authorization system with an electronic immobilization function. The electronic immobilization function described is coupled to a crankshaft sensor. Via an encoder wheel arranged on the crankshaft, the crankshaft sensor detects the position and/or the rotational speed of the crankshaft and transmits it to an engine control unit which enables the electronic immobilization function. The encoder wheel comprises a predefined number of teeth which are distributed along the circumference of the encoder wheel by means of a code. The teeth generate an encoded rotational speed signal which is detected by the crankshaft sensor and can be decoded by the engine control unit. The engine control unit enables the immobilization function only after successful decoding of the encoded rotational speed signal.

The object of the invention is to devise a drive authorization system for an electric drive which permits mechatronic linking of an electronic immobilization function to an electric drive and hence increased protection against theft.

The invention solves this problem by providing a particular drive authorization system for an electric drive.

Advantageous embodiments and developments of the invention are also set forth in the claims.

According to the invention, to implement an electronic immobilization function, the positions and/or the number of active rotation angle sensors are/is made encodable. An evaluation and control unit is used for determining a current position of a movable element of an electric drive, with a predefined number of field coils decoding the encoded positional information of the active angle of rotation sensors. In such a case, operation of the electric drive is possible only after successful decoding of the positional information. Furthermore, the evaluation and control unit for operation of the electric drive determines a current position of the movable element from several items of positional information which are made available by a predefined number of rotation angle sensors.

The linking of the function of immobilization to a vehicle part which is difficult to exchange, such as the electric drive, advantageously makes it considerably more difficult to exchange components in order to circumvent the immobilization function. The linking takes place according to the invention via the embodiment, individual to the drive, of the rotation angle sensor system for determining the mechanical position of the angle of rotation of the movable element of the electric drive, which is necessary in order to operate a contact-free electric drive. The embodiment, individual to the drive, of the rotation angle sensor system is decoded in the evaluation and control unit of the vehicle in order to be able to control the electric drive correctly. Thus the invention makes it possible to realize an effective immobilization function, so that simply exchanging the control unit is not sufficient to circumvent the electronic immobilization function. A further advantage is that the rotation angle sensors, in the technical embodiment in the electric drive of the vehicle, are accessible from the outside only with difficulty, and thus make rapid manipulation difficult.

In an embodiment of the drive authorization system according to the invention, the number of positions present for the active rotation angle sensors is greater than the number of active rotation angle sensors. To unambiguously determine the position of the movable element, at least three angle of rotation sensors are necessary, which are arranged at three different positions. If more positions for the possible arrangement of angle of rotation sensors are now made available, the angle of rotation sensors for each electric drive can be arranged individually. The evaluation and control unit can, for example, be adapted to the changed positional information of the angle of rotation sensors by a decoding algorithm, in order to set the movable element of the electric drive in motion. An incorrect evaluation of the positional information owing to a wrongly assumed position of the angle of rotation sensors here does not result in a movement of the movable element of the electric drive. Apart from the positions of the individual angle of rotation sensors, the number of active angle of rotation sensors, the positional information of which is evaluated for determining the position of the movable element, can also be encoded or varied. In addition, it is possible to arrange a rotation angle sensor at each of the possible positions and to couple it with the evaluation and control unit, so that the positional encoding is not immediately obvious.

In a preferred embodiment of the drive authorization system according to the invention, the evaluation and control unit decodes the encoded positional information of the active angle of rotation sensors with a decoding algorithm which can be enabled and activated by an authorized authentication element. An enabling signal for the decoding algorithm in the evaluation and control unit may be generated by an electronic ignition lock after successful authentication, the electronic ignition lock communicating with the portable authentication element via a communications link for authentication.

In a preferred embodiment of the drive authorization system according to the invention, the angle of rotation sensors are embodied as Hall effect sensors. In addition, the rotor has a rotor shaft which is connected to a permanent magnet. The rotation angle sensors embodied as Hall effect sensors then detect the positional information from which the position of the permanent magnet can be determined.

BRIEF DESCRIPTION OF THE DRAWING

An advantageous embodiment of the invention is illustrated in the drawing and will be described below. The sole FIGURE shows a diagrammatic block diagram of an embodiment of a drive authorization system according to the invention for an electric drive.

DETAILED DESCRIPTION OF THE INVENTION

As is apparent from the FIGURE, an electric drive 10 in the embodiment illustrated comprises six field coils 11, 12, 13, 14, 15, 16 and a rotationally movable element 17, which is embodied as a rotor with a rotor shaft 18 connected to a permanent magnet 19. Between the field coils 11, 12, 13, 14, 15, 16, six possible positions 21.1, 22.1, 23.1, 24.1, 25.1, 26.1 for arranging rotation angle sensors 21, 22, 23, 24, 25, 26 are shown. An evaluation and control unit 20 for the operation of the electric drive 10 determines a current position of the movable element 17 from several items of positional information which are made available by a predefined number of angle of rotation sensors 21, 22, 23, 24, 25, 26. To implement an electronic immobilization function, the positions 21.1, 22.1, 23.1, 24.1, 25.1, 26.1 and/or the number of the active angle of rotation sensors 21, 22, 23, 24, 25, 26 are/is made encodable, and the evaluation and control unit 20 decodes the encoded positional information of the active angle of rotation sensors 21, 22, 23, 24, 25, 26 in order to determine the current position of the movable element 17. In this case, operation of the electric drive 10 is only possible after successful decoding of the positional information. In order to be able to carry out corresponding encoding, the number of positions present for the active angle of rotation sensors 21, 22, 23, 24, 25, 26 is greater than the number of active rotation angle sensors 21, 22, 23, 24, 25, 26, and the evaluation and control unit 20 decodes the encoded positional information of the active rotation angle sensors 21, 22, 23, 24, 25, 26 with a decoding algorithm that is enabled and activated by an authorized authentication element. The associated enabling signal for the decoding algorithm in the evaluation and control unit 20 may be generated by an electronic ignition lock (not shown) after successful authentication, with the electronic ignition lock communicating with the portable authentication element via a communications link for authentication.

In addition, in the embodiment of the drive authorization system illustrated, the angle of rotation sensors 21, 22, 23, 24, 25, 26 are embodied as Hall effect sensors, which detect the positional information from which the position of the permanent magnet 19 of the rotor 17 can be determined.

The linking according to the invention of the immobilization function to a vehicle part which is difficult to exchange, such as, in this case, to the electric drive, makes exchanging in order to circumvent the immobilization function considerably more difficult. The linking takes place via the embodiment, individual to the drive, of the rotation angle sensors 21, 22, 23, 24, 25, 26 for determining the mechanical position of the angle of rotation of the rotor 17, which is necessary in order to operate the electric drive 10 illustrated, which is embodied as a contact-free electric motor. The embodiment, individual to the drive, of the angle of rotation sensors 21, 22, 23, 24, 25, 26 is decoded in the evaluation and control unit 20, so that the electric drive 10 can be controlled correctly.

The embodiment illustrated in the FIGURE has what is called an internal rotor, with the movable element, embodied as a rotor 17, located inside the coil arrangement. In order to start up the electric drive 10, the field coils 11, 12, 13, 14, 15, 16 have to have the correct polarity at the correct times dependent on the rotational speed. In the FIGURE, a first field coil 11, as coil A, corresponds to a first phase 1, and a second field coil 14, as coil B, corresponds to the first phase 1. A third field coil 12, as coil A, corresponds to a second phase 2, and a fourth field coil 15, as coil B, corresponds to the second phase 2. A fifth field coil 13, as coil A, corresponds to a third phase 3, and a sixth field coil 16, as coil B, corresponds to the third phase 3. The switchover is electronically controlled by the evaluation and control unit 20. For this, the position of the rotor 17 is determined by way of the rotation angle sensors 21, 22, 23, 24, 25, 26. By way of the Hall effect and the permanent magnet 19 of the rotor 17, the activated rotation angle sensors 21, 22, 23, 24, 25, 26 supply positional information, which is evaluated in the evaluation and control unit 20, and by way of which the field coils 11, 12, 13, 14, 15, 16 can be appropriately controlled, so that the rotary movement of the rotor 17 takes place.

At least three rotation angle sensors 21, 22, 23, 24, 25, 26 are necessary for unambiguous determination of position in the electric drive 10 illustrated. To carry out decoding, only the three angle of rotation sensors 21, 22, 23 may be installed in the electric drive and arranged at positions 21.1, 22.1, 23.1 in order to determine the exact position of the rotor 17. The three rotation angle sensors 21, 22, 23 can thus be arranged individually for each electric drive 10, and not at the positions 21.1, 22.1 and 22.3, but, for example, at the positions 21.1, 24.1 and 25.1, etc. A corresponding electronic control in the evaluation and control unit 20 then has to be adapted to the changed positional information in order to cause rotary motion of the rotor 17. An incorrect evaluation of the angle of rotation signals owing to wrongly assumed positions 21.1, 22.1, 23.1, 24.1, 25.1, 26.1 of the installed angle of rotation sensors 21, 22, 23, 24, 25, 26 then will not result in a rotary movement of the rotor 17. To improve encoding, as in the embodiment illustrated, a rotation angle sensor 21, 22, 23, 24, 25, 26 can be arranged at each possible position 21.1, 22.1, 23.1, 24.1, 25.1, 26.1. Only three sensors, in each case, are activated by the evaluation and control unit 20 in order to determine the current position of the rotor 17. The positions 21.1, 22.1, 23.1, 24.1, 25.1, 26.1 used for determining the rotor position can be changed during operation accordingly.

Thus, the embodiments of the invention described can be utilized for effective immobilization, and hence for antitheft purposes. It is advantageous here that the rotation angle sensors 21, 22, 23, 24, 25, 26, in the technical embodiment of the electric drive 10 of the vehicle, are accessible from the outside only with difficulty, and thus make rapid manipulation difficult. The six rotation angle sensors 21, 22, 23, 24, 25, 26 or the six possible sensor positions 21.1, 22.1, 23.1, 24.1, 25.1, 26.1 used in this embodiment, of course, only allow a limited number of combinations for individualized electric drives 10. In further embodiments (not shown), more than six positions, or a different number of rotation angle sensors, can be used to obtain extended encoding possibilities for the positional information.

The invention claimed is:

1. A drive authorization system for an electric drive comprising:
   rotation angle sensors,
   a predefined number of field coils,
   a rotationally movable element, and
   an evaluation and control unit for operation of the electric drive determining a current position of the movable element from several items of positional information made available by a predefined number of said rotation angle sensors,
   wherein, to implement an electronic immobilization function, positions of active rotation angle sensors, a number of active rotation angle sensors, or both the positions of and the number of active angle of rotation sensors are made encodable, wherein the evaluation and control unit decodes encoded positional information of the active rotation angle sensors in order to determine the current position of the movable element, and wherein operation of the electric drive is possible only after successful decoding of the positional information.

2. The drive authorization system as claimed in claim 1, wherein the number of active rotation angle sensor positions is greater than the number of active rotation angle sensors.

3. The drive authorization system as claimed in claim 2, wherein the evaluation and control unit decodes the encoded positional information of the active rotation angle sensors with a decoding algorithm that can be enabled and activated by an authorized authentication element.

4. The drive authorization system as claimed in claim 3, wherein an enabling signal for the decoding algorithm in the evaluation and control unit can be generated by an electronic ignition lock after successful authentication, and wherein the electronic ignition lock communicates with the authorized authentication element via a communications link for authentication.

5. The drive authorization system as claimed in claim 2, wherein the rotation angle sensors are Hall effect sensors.

6. The drive authorization system as claimed in claim 2, wherein the movable element is a rotor that has a rotor shaft connected to a permanent magnet.

7. The drive authorization system as claimed in claim 6, wherein the rotation angle sensors detect positional information from which a position of the permanent magnet can be determined.

8. The drive authorization system as claimed in claim 1, wherein the evaluation and control unit decodes the encoded positional information of the active rotation angle sensors with a decoding algorithm that can be enabled and activated by an authorized authentication element.

9. The drive authorization system as claimed in claim 8, wherein an enabling signal for the decoding algorithm in the evaluation and control unit can be generated by an electronic ignition lock after successful authentication, and wherein the electronic ignition lock communicates with the authorized authentication element via a communications link for authentication.

10. The drive authorization system as claimed in claim 9, wherein the rotation angle sensors are Hall effect sensors.

11. The drive authorization system as claimed in claim 9, wherein the movable element is a rotor that has a rotor shaft connected to a permanent magnet.

12. The drive authorization system as claimed in claim 11, wherein the rotation angle sensors detect positional information from which a position of the permanent magnet can be determined.

13. The drive authorization system as claimed in claim 8, wherein the rotation angle sensors are Hall effect sensors.

14. The drive authorization system as claimed in claim 8, wherein the movable element is a rotor that has a rotor shaft connected to a permanent magnet.

15. The drive authorization system as claimed in claim 14, wherein the rotation angle sensors detect positional information from which a position of the permanent magnet can be determined.

16. The drive authorization system as claimed in claim 1, wherein the rotation angle sensors are Hall effect sensors.

17. The drive authorization system as claimed in claim 1, wherein the movable element is a rotor that has a rotor shaft connected to a permanent magnet.

18. The drive authorization system as claimed in claim 17, wherein the rotation angle sensors detect positional information from which a position of the permanent magnet can be determined.

* * * * *